US007006623B1

(12) United States Patent
Patel

(10) Patent No.: US 7,006,623 B1
(45) Date of Patent: Feb. 28, 2006

(54) CIRCUIT FOR REDUCING VOLTAGE PEAK IN INTERFACING WITH A TELEPHONE LINE

(75) Inventor: Ketankumar B. Patel, Lake Forest, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 360 days.

(21) Appl. No.: 10/016,194

(22) Filed: Nov. 2, 2001

(51) Int. Cl.
*H04M 1/31* (2006.01)

(52) U.S. Cl. .................. 379/377; 379/362; 379/395.01

(58) Field of Classification Search ................ 379/413, 379/362, 377, 393, 387.01; 330/185
See application file for complete search history.

(56) References Cited

U.S. PATENT DOCUMENTS 3,968,333 A * 7/1976 Simokat et al. ............. 379/413
5,121,425 A * 6/1992 Reichelt ..................... 379/362
5,425,096 A * 6/1995 Okada ........................ 379/362
5,500,895 A * 3/1996 Yurgelites ................... 379/412
6,621,904 B1 * 9/2003 Fischer et al. ......... 379/413.01

* cited by examiner

*Primary Examiner*—Sinh Tran
*Assistant Examiner*—Walter F Briney, III
(74) *Attorney, Agent, or Firm*—Farjami & Farjami LLP

(57) ABSTRACT

According to an embodiment, a DC driver circuit is coupled to a tip/ring line. The DC driver circuit includes a first capacitor coupled to a first switch where the first switch is coupled to an amplification circuit. An RC circuit is coupled to a second switch where the second switch is coupled to the amplification circuit. During a make state, the first and second switches are closed, causing the amplification circuit to draw current from the tip/ring line. During a break state, the first and second switches are open, preventing the amplification circuit from drawing current from the tip/ring line. The transition from the make state, during which a significant amount of current is drawn from the tip/ring line, to the break state, during which no current should be drawn from the tip/ring line, occurs at a rate that results in a significantly reduced voltage peak at the tip/ring line.

10 Claims, 3 Drawing Sheets

CIRCUIT FOR REDUCING VOLTAGE PEAK IN INTERFACING WITH A TELEPHONE LINE

BACKGROUND OF THE INVENTION

1. Field of the Invention

The present invention is generally in the field of communications. More specifically, the present invention is in the field of modem communication over a telephone line.

2. Background Art

Some applications require pulse dialing compliance in communications devices, such as modems, that communicate over a telephone line. The pulse dialing circuits in modems typically cause large voltage spikes, or voltage peaks, on the telephone line when the modem is operating in a pulse dialing mode. Although protection devices such as metal oxide varistors ("MOV") and sidactors in modems limit the voltage spike to 400.0 volts, some applications require the maximum voltage spike to be only 230.0 volts. To meet the requirement of a maximum voltage spike of 230.0 volts, an expensive external limiting circuit is often required.

FIG. 1 shows a block diagram including some of the circuit blocks in an exemplary modem for communication over a telephone line in a pulse dialing mode. Although only some of the blocks in the exemplary modem have been shown, the block diagram of FIG. 1 is referred to as "modem 100" in the present application for ease of reference. In modem 100 in FIG. 1, receiver 122 is connected to diode bridge 108 via tip and ring ("tip/ring" or "T/R") line 114. AC driver 102 is coupled to T/R line 114 via line 116, and DC driver 104 is coupled to T/R line 114 via line 118. Clamp 106 is coupled to T/R line 114 via line 120. A telephone line is connected to diode bridge 108 at TIP terminal 110 and RING terminal 112.

Describing modem 100 in more detail, receiver 122 receives data over a telephone line via T/R line 114 and diode bridge 108. AC driver 102 sets the termination impedance of modem 100 and further includes a transmitter (not shown in FIG. 1) for sending data over a telephone line. DC driver 104 controls the DC loop current drawn from T/R line 114, and further includes a pulse dialing circuit (not shown in FIG. 1) for communicating over a telephone line through pulses generated by switching the DC loop current on and off.

Clamp 106 typically comprises a high voltage transistor to enable the clamp during pulse dialing mode and an MOV to prevent the size of the voltage spikes generated on T/R line 114 in pulse dialing mode from exceeding a predetermined limit. Diode bridge 108 rectifies the telephone line voltage at TIP terminal 110 and RING terminal 112 to provide voltage of the appropriate polarity to the circuitry in modem 100.

FIG. 2 shows a schematic diagram of DC driver 104 in modem 100 in FIG. 1. DC driver circuit 204 includes exemplary pulse dialing circuit 202, which comprises resistors 214, 218, 230, and 234, op amp 224, and switches 220, 238, and 242. In FIG. 2, a first terminal of resistor 284 is connected to node 206, also referred to as the tip and ring node or the T/R node, and a second terminal of resistor 284 is connected to node 208. A T/R line can be connected to node 206. T/R line at node 206 can be further connected to a telephone line via a diode bridge, such as diode bridge 108 in FIG. 1.

A first terminal of capacitor 210 is connected to node 208, and a second terminal of capacitor 210 is connected to ground. A first terminal of capacitor 212 is connected to node 208, and a second terminal of capacitor 212 is connected to ground. A first terminal of resistor 214 is connected to node 208, and a second terminal of resistor 214 is connected to node 216. A first terminal of resistor 218 is connected to node 216, and a second terminal of resistor 218 is connected to ground. A first terminal of switch 220 is connected to node 216, and a second terminal of switch 220 is connected to voltage source 222 (also referred to as "Vdcdac"). A "+" input terminal of op amp 224 is connected to node 208, and a "−" input terminal of op amp 224 is connected to node 228.

A "V+" terminal of op amp 224 is connected to voltage source 226 (i.e. "Vdd"), and a "V−" terminal of op amp 224 is connected to ground. The output of op amp 224 is connected to node 240 (also referred to as node EIO). A first terminal of switch 242 is connected to node 240, and a second terminal of switch 242 is connected to ground. A first terminal of resistor 230 is connected to node 228, and a second terminal of resistor 230 is connected to voltage source 232, i.e. "Vref". A first terminal of resistor 234 is connected to node 228, and a second terminal of resistor 234 is connected to node 236 (also referred to as node EIF).

A first terminal of switch 238 is connected to node 236, and a second terminal of switch 238 is connected to ground. The base of transistor 244 is connected to node 240, and the collector of transistor 244 is connected to node 206. The base of transistor 246 is connected to the emitter of transistor 244, and the collector of transistor 246 is connected to node 206. The emitter of transistor 246 is connected to node 236. A first terminal of resistor 248 is connected to node 236, and a second terminal of resistor 248 is connected to ground.

Pulse dialing circuit 202 can operate in a normal mode and a pulse dialing mode. In the normal mode, pulse dialing circuit 202 uses op amp 224 and voltage source 222 to control how much DC loop current (also referred to as "IT") is drawn from T/R line at node 206 by transistors 244 and 246. In pulse dialing mode, pulse dialing circuit 202 uses two states, an "off-hook" (also referred to as "make") state and an "on-hook" (also referred to as "break") state, to turn the DC loop current (i.e. "IT") drawn by transistors 244 and 246 on and off.

At the initiation of a "break" state, switches 242 and 238 close, thereby shorting the base of transistor 244 and the emitter of transistor 246 to ground. As a result, transistors 244 and 246 shut off and "IT" immediately goes to zero. The rapid change in "IT" from a "make" current level to zero induces a voltage spike on T/R line at node 206 as a result of normal load inductance on T/R line at node 206. The resulting voltage spike on T/R line at node 206 requires a costly clamping circuit, such as clamp 106 in FIG. 1, to meet maximum voltage spike requirements in some applications. Additionally, the sharp transition that results from a rapid change in "IT", i.e. the DC loop current, generates high frequency harmonics that may interfere with additional services, such as digital subscriber line ("DSL"), that may be sharing the same telephone line as a modem including exemplary pulse dialing circuit 202.

Thus, there is a need in the art for a pulse dialing circuit that limits the size of voltage peaks in pulse dialing mode to meet application requirements without the use of a costly limiting circuit. Additionally, there is a need in the art for a pulse dialing circuit that does not generate high frequency harmonics that interfere with various services, such as DSL services, sharing a telephone line.

SUMMARY OF THE INVENTION

The various embodiments of the present invention are directed to a circuit for reducing voltage peak in interfacing with a telephone line. The present invention provides a circuit that limits the size of voltage peaks in pulse dialing mode to meet application requirements without the use of a costly limiting circuit. Moreover, the invention's circuit prevents the generation of high frequency harmonics that interfere with various services sharing a telephone line.

According to an embodiment of the present invention, a DC driver circuit is coupled to a tip/ring line. The DC driver circuit includes a first capacitor coupled to a first switch to where the first switch is coupled to an amplification circuit. The amplification circuit can include, for example, an op amp and one or more transistors driven by the op amp. An RC circuit at an input of the amplification circuit comprising, for example, a second capacitor and one or more resistors, is coupled to a second switch where the second switch is coupled to a voltage source such as a programmable voltage source.

During a make state, the first and second switches are closed, causing the amplification circuit to draw current from the tip/ring line. During a break state, the first and second switches are open, preventing the amplification circuit from drawing current from the tip/ring line. The invention comprises a third switch to precharge the first capacitor during the break state.

According to the various embodiments of the present invention, the transition from the make state, during which a significant amount of current is drawn from the tip/ring line, to the break state, during which no current should be drawn from the tip/ring line, occurs at a rate that results in a significantly reduced voltage peak at the tip/ring line. Various other details and advantages of the present invention are explained in the following detailed description.

DETAILED DESCRIPTION OF THE INVENTION

The present invention is directed to a circuit for reducing voltage peak in interfacing with a telephone line. The following description contains specific information pertaining to various embodiments and implementations of the invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skills in the art.

The drawings in the present application and their accompanying detailed description are directed to merely example embodiments of the invention. To maintain brevity, other embodiments of the invention that use the principles of the present invention are not specifically described in the present application and are not specifically illustrated by the present drawings.

Figure 3:
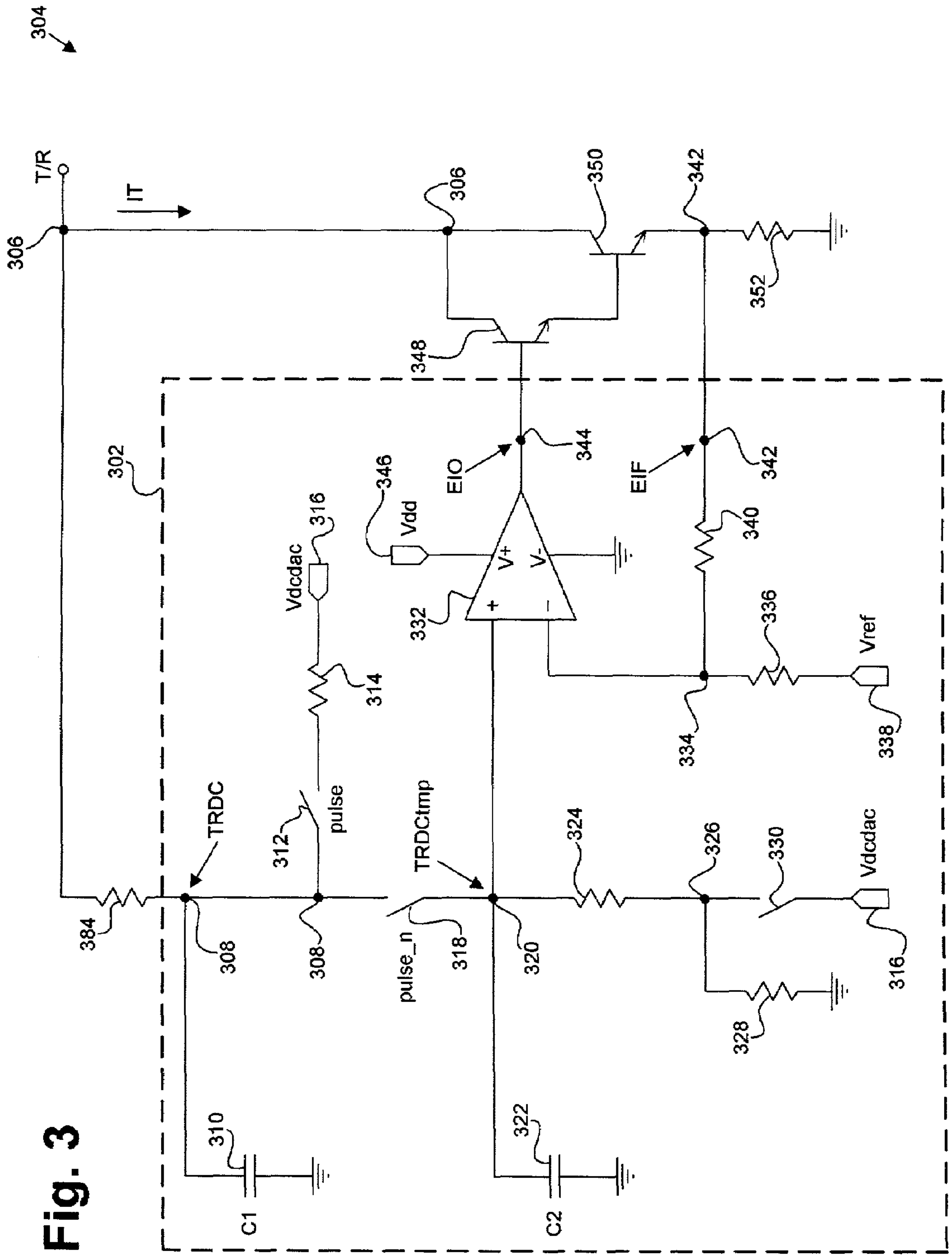
FIG. 3 illustrates a circuit diagram of a DC driver circuit, including a pulse dialing circuit, in accordance with one embodiment of the present invention.

FIG. 3 shows a schematic diagram of a DC driver circuit in accordance with one embodiment of the present invention. DC driver circuit 304 includes an embodiment of the present invention's pulse dialing circuit 302. Pulse dialing circuit 302 can be included in a data access arrangement ("DAA") circuit of a modem. In one embodiment, pulse dialing circuit 302 can be included in the DAA circuit of a SmartDAA™ V.90 modem. In the present embodiment, pulse dialing circuit 302, excluding capacitor 310 (also referred to as "C1") and capacitor 322 (also referred to as "C2"), can be an integrated circuit ("IC"). As such, op amp 332, resistors 314, 324, 328, 336, and 340, switch 330, pulse_n switch 318, and pulse switch 312 (i.e. the components that form pulse dialing circuit 302, excluding "C1" and "C2") are collectively referred to as "internal" components of pulse dialing circuit 302 in the present application. In contrast, "C1 " and "C2" are collectively referred to as "external" components of pulse dialing circuit 302.

Figure 1:
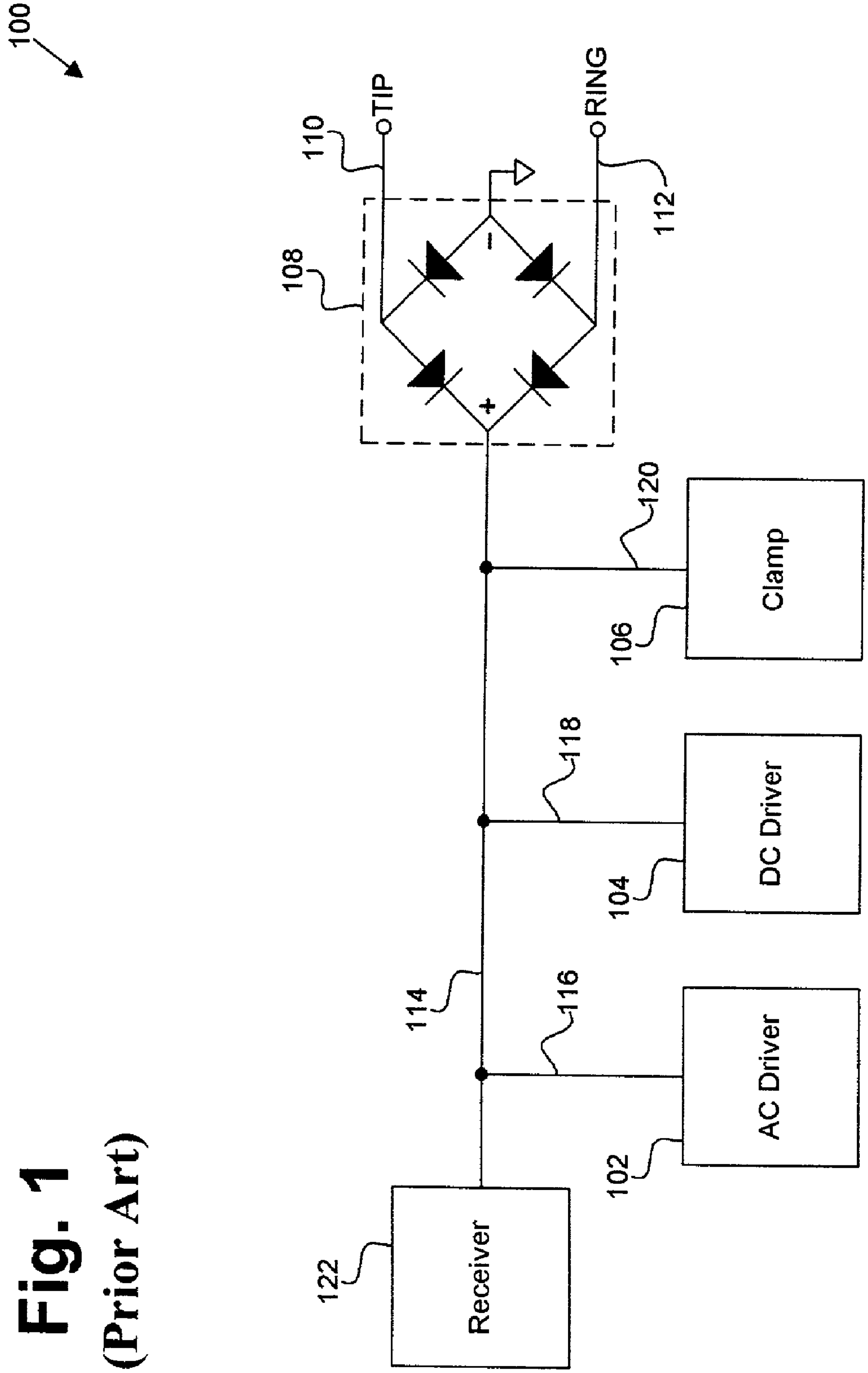
FIG. 1 illustrates a block diagram of some of the circuit blocks in an exemplary modem.
Figure 2:
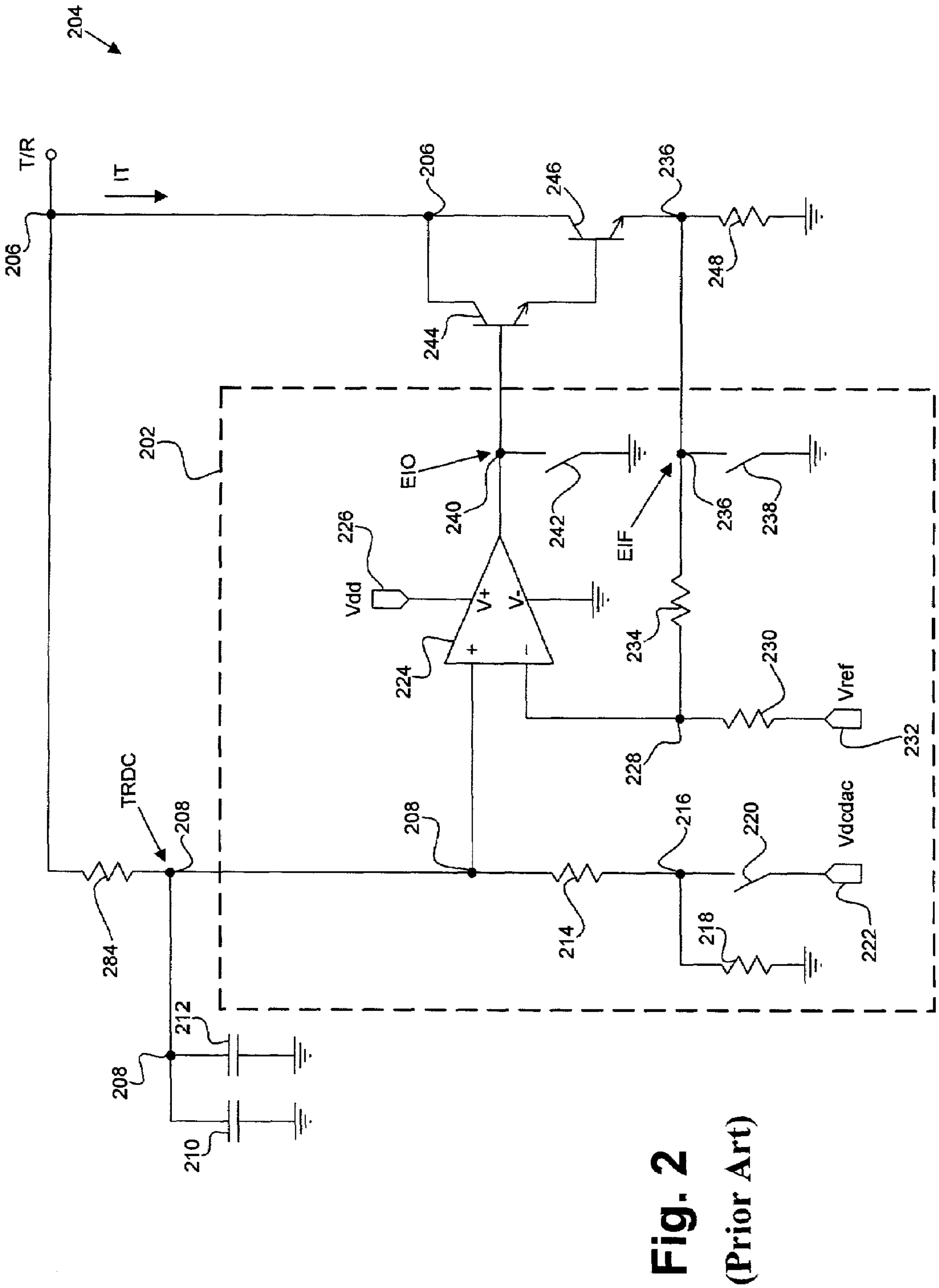
FIG. 2 illustrates a circuit diagram of an exemplary DC driver circuit, including an exemplary pulse dialing circuit.

In FIG. 3, a first terminal of resistor 384 is connected to node 306, also referred to as the tip and ring node or the T/R node, and a second terminal of resistor 384 is connected to node 308. The value of resistor 384 might be, for example, 6.8 mega ohms. A T/R line can be connected to node 306. T/R line at node 306 can be further connected to a telephone line via a diode bridge, such as diode bridge 108 in FIG. 1. It is noted that a T/R line which can be connected to node 306 is also referred to as a "tip/ring line" or a "selected line" in the present application.

A first terminal of capacitor 310 is connected to node 308, also referred to as node TRDC, and a second terminal of capacitor 310 is connected to ground. By way of example, the value of capacitor 310, i.e. "C1," might be 100.0 nanofarads ("nF"). A first terminal of pulse switch 312 is connected to node 308, and a second terminal of pulse switch 312 is connected to a first terminal of resistor 314. By way of example, the value of resistor 314 might be 10.0 kilo ohms. A second terminal of resistor 314 is connected to voltage source 316, also referred to as "Vdcdac". In one embodiment, Vdcdac can be a software-controlled voltage source. The value of Vdcdac might be, for example, 0.5 to 2.5 volts. A first terminal of pulse_n switch 318 is connected to node 308, and a second terminal of pulse_n switch 318 is connected to node 320, also referred to as node "TRDCtmp".

A first terminal of capacitor 322 is connected to node 320, and a second terminal of capacitor 322 is connected to ground. By way of example, the value of capacitor 322, i.e. "C2," might be 10.0 nF. It is noted that according to an embodiment of the present invention capacitor "C1" is much larger than capacitor "C2." A first terminal of resistor 324 is connected to node 320, and a second terminal of resistor 324 is connected to node 326. In one embodiment, the value of resistor 324 can be controlled by software. By way of example, the value of resistor 324 might be 500.0 kilo ohms. A first terminal of resistor 328 is connected to node 326, and a second terminal of resistor 328 is connected to ground. As an example, the value of resistor 328 might be 20.0 kilo ohms. A first terminal of switch 330 is connected to node 326, and a second terminal of switch 330 is connected to voltage source 316 (i.e. Vdcdac). It is noted that the combination of capacitor 322, resistor 324, and/or resistor 328 is also referred to as an "RC circuit" in the present application.

The "+" input terminal of operational amplifier ("op amp") 332 is connected to node 320, and the "−" input terminal of op amp 332 is connected to node 334. A first terminal of resistor 336 is connected to node 334, and a second terminal of resistor 336 is connected to voltage source 338, also referred to as "Vref". As an example, the value of resistor 336 might be 30.0 kilo ohms. A first terminal of resistor 340 is connected to node 334, and a second terminal of resistor 340 is connected to node 342 (also referred to as node "EIF").

The "V+" terminal of op amp 332 is connected to voltage source 346, also referred to as "Vdd", and the "V−" terminal of op amp 332 is connected to ground. The output terminal of op amp 332 is connected to node 344, also referred to as node "EIO". The base of transistor 348 is connected to node 344, and the collector of transistor 348 is connected at node 306. The emitter of transistor 348 is connected to the base of transistor 350. The collector of transistor 350 is connected to node 306, and the emitter of transistor 350 is connected to node 342. A first terminal of resistor 352 is connected to node 342, and a second terminal of resistor 352 is connected to ground. By way of example, the value of resistor 352 might be 9.0 to 27.0 ohms.

The operation of the invention's pulse dialing circuit 302 in FIG. 3 will now be discussed. Pulse dialing circuit 302 can operate in a normal mode and a pulse dialing mode. In the normal mode, pulse dialing circuit 302 controls how much DC loop current (also referred to as "IT") is drawn from T/R line at node 306 by transistors 348 and 350. Transistor 348 and transistor 350 are connected together in a Darlington configuration, whose function and behavior is known in the art. The Darlington configuration is preferred to a single-transistor configuration to increase current gain.

Transistors 348 and 350 are controlled by op amp 332, which can be, for example, a voltage-mode op amp whose function and behavior is well known in the art. It is noted that the combination of op amp 332, transistor 348 and/or transistor 350 is also referred to as an "amplification circuit" in the present application. A voltage at node TRDCtmp (i.e. the "+" input terminal of op amp 332) is amplified by op amp 332 at node EIO (i.e. the output of op amp 332) to provide a DC bias voltage at the base of transistor 348. As a result of the DC bias voltage at it base, transistor 348 is turned on and injects current into the base of transistor 350. As such, transistor 350 also turns on. When transistors 348 and 350 are both on, "IT" (i.e. DC loop current) can flow through the respective collectors of transistors 348 and 350. Due to negative feedback, the DC loop current generates a voltage across resistor 352 such that the voltage a node 342 forces the voltage at node 334 to be equal to the voltage at node TRDCtmp. Thus the value of the voltage at node TRDCtmp determines how hard transistors 348 and 350 are driven, and, therefore, how much DC loop current transistors 348 and 350 draw (i.e. the value of "IT").

When pulse dialing circuit 302 is operating in normal mode, switch 330 is closed, pulse_n switch 318 is closed and pulse switch 312 is open. Pulse_n switch 318 and pulse switch 312 operate in a complementary manner (i.e. when pulse_n switch 318 is closed, pulse switch 312 is open, and visa versa). The value of the voltage at node TRDCtmp depends on the value of the voltage on T/R line at node 306, the value of resistors 384, 324, and 328 (which form a voltage divider), and the value of Vdcdac. Further, the value of the voltage at node TRDCtmp depends on the loop current requirements of the particular application pulse dialing circuit 302 is used in. However, in one embodiment, the value of resistor 324 and the value of Vdcdac can be controlled by software, i.e. can be programmable, to maintain a desired voltage at node TRDCtmp, i.e. at node 320. An exemplary value of 1.5 volts at node TRDCtmp, i.e. at node 320, is used for the purpose of illustration in the present application when pulse dialing circuit 302 is operating in normal mode.

In pulse dialing mode, pulse dialing circuit 302 uses two states, an "off-hook" state, also referred to as a "make" state, and an "on-hook" state, also referred to as a "break" state, to perform pulse dialing. In the "break" state, transistors 348 and 350 are shut off (i.e. not drawing DC loop current from T/R line at node 306). In the "make" state, transistors 348 and 350 are conducting, and, therefore, drawing DC loop current from T/R line at node 306. The "break" and "make" states are discussed in more detail below.

At the initiation of the "break" state, switch 330 opens to disconnect Vdcdac at node 326, thus preventing Vdcdac from supplying voltage to node TRDCtmp. Pulse_n switch 318 also opens, thereby disconnecting node TRDC from node TRDCtmp. Since T/R line at node 306 is connected to node TRDC via resistor 384, T/R line at node 306 is also disconnected from node TRDCtmp when Pulse_n switch 318 opens. As a result, the voltage at node TRDCtmp (i.e. the exemplary 1.5 volts discussed above) can discharge to ground via resistors 324 and 328. The voltage at node TRDCtmp discharges to ground at a rate determined by a time constant set by the values of "C2" and resistors 324 and 328.

Thus, the rate of discharge of the voltage at node TRDCtmp can be controlled by the values selected for "C2" and resistors 324 and 328. The present invention provides a benefit of allowing the above time constant to be easily controlled by changing the value of "C2," an "external" component of pulse dialing circuit 302, without having to change "internal" components. Since changing the value of "C2" affects the shape of the pulse generated in the "break" state, the present invention provides a further advantage of giving a circuit designer flexibility to change the pulse shape (generated in the "break" state) by simply changing the value of "C2."

Since the voltage at node TRDCtmp controls transistors 348 and 350 via op amp 332, the rate at which transistors 348 and 350 turn off can also be controlled by the values selected for "C2" and resistors 324 and 328. The rate at which transistors 348 and 350 turn off also determines the rate at which "IT" (i.e. DC loop current drawn by transistors 348 and 350 at T/R line at node 306) changes with time (i.e. "dIT/dt"). When "IT" changes rapidly, a voltage spike (also referred to as "Vi") is induced on T/R line at node 306. The value of "Vi" is determined by the equation "Vi"="L"* "dIT/dt", where "L" is the "inductance" on T/R line at node 306, and "dIT/dt" is the rate of change of DC loop current. By way of background, the "inductance" on T/R line at node 306 can result from inductive components on a typical telephone line and in a Central Office feeding network.

Thus, by decreasing "dIT/dt" (i.e. slowing down the rate at which transistors 348 and 350 turn off) by selecting appropriate values for "C2" and resistors 324 and 328, the size (i.e. the amplitude) of "Vi" can be decreased. Thus, the present invention provides a decreased amplitude of "Vi" that meets pulsing dialing "mask" requirements of various applications. By way of background, a pulse dialing "mask" requirement is a specification that provides a limit on the amplitude of the voltage spike that can occur on a telephone line during pulse dialing. The pulse dialing "mask" also specifies the limits on how fast and how slow, respectively, the pulses generated during pulse dialing can transition from "make" state to "break" state, and from "break" state to "make" state. An embodiment of the present invention limits the amplitude of "Vi," i.e. the voltage spike or the "peak voltage" generated at T/R line at node 306 during "break" state, to a maximum of 230.0 volts. Thus, the present invention provides an advantage in meeting pulse dialing "mask" requirements of various applications by reducing the peak voltage at node 306, i.e. by reducing the amplitude of "Vi", without the use of a costly external clamping circuit, such as clamp 106 in modem 100 in FIG. 1.

Continuing with the operation of pulse dialing circuit 302 at the initiation of the "break" state, when pulse_n switch 318 opens, pulse switch 312 closes to connect Vdcdac to "C1" at node TRDC. Vdcdac precharges "C1" to the final voltage that TRDCtmp is required to have in the "make" state. For example, if TRDCtmp were required to have a final voltage of 1.5 volts in the "make" state, then Vdcdac would precharge "C1" to 1.5 volts. In one embodiment, Vdcdac precharges "C1" to a slightly higher voltage than the final "make" state voltage at TRDCtmp.

At the initiation of the "make" state, switch 330 closes to reconnect Vdcdac to node 326, pulse switch 312 opens to disconnect Vdcdac from node TRDC, and pulse_n switch 318 closes to reconnect node TRDC to node TRDCtmp. Since "C1" has a much larger capacitance than "C2," when node TRDC is reconnected to node TRDCtmp, "C1" transfers a large amount of charge onto "C2." The large amount of charge that "C1" transfers onto "C2" causes the voltage at node TRDCtmp to rise rapidly to a required "make" state voltage (i.e. the voltage at node TRDCtmp in normal operating mode). The rapid rise in voltage at node TRDCtmp causes transistors 348 and 350 to quickly turn on and begin drawing DC loop current via op amp 332. Thus, by precharging "C1" to the required "make" state voltage at node TRDCtmp, an embodiment of the present invention enables "IT" (i.e. the DC loop current) to rise fast enough during the "make" state transition to meet pulse dialing "mask" requirements.

In conventional DC driver circuits, such as DC driver circuit 204 discussed above, when a pulse dialing circuit generates a sharp "break" state transition, i.e. where the value of "IT" changes rapidly from a normal mode value to zero, the sharp "break" state transition produces high frequency harmonics that can interfere with DSL services on a shared telephone line. According to the present invention, as described above, by slowing the rate at which "IT" changes with time (i.e. decreasing "dIT/dt"), pulse dialing circuit 302 provides a smooth "break" state transition that produces minimal high frequency harmonics. Thus, the present invention provides an advantage of meeting DSL interference "mask" requirements in pulsing dialing mode when sharing a telephone line with DSL services.

Additionally, the present invention's pulse dialing circuit 302 is able to utilize existing "external" components, i.e. "C1" and "C2," that are also used for functions other than pulse dialing. Thus, the present invention provides an additional benefit of reduced cost of implementation. Moreover, the use of external components, i.e. "C1" and "C2," provides flexibility in fine tuning the operation of DC driver circuit 304 and pulse dialing circuit 302 by easily experimenting with different values of "C1" and "C2."

It is appreciated by the above detailed description that the invention provides a circuit for reducing voltage peak in interfacing with a telephone line. From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, a circuit for reducing voltage peak in interfacing with a telephone line has been described.

What is claimed is:

1. A DC driver circuit coupled to a tip/ring line, said DC driver circuit comprising:

a first capacitor coupled to a first switch, said first switch coupled to an amplification circuit, said amplification circuit being coupled to said tip/ring line;

an RC circuit coupled to a second switch, said second switch coupled to said amplification circuit, said RC circuit comprising a second capacitor and at least one resistor;

said first switch being closed and said second switch being closed during a make state to cause said amplification circuit to draw current from said tip/ring line;

said first switch being open and said second switch being open during a break state to prevent said amplification circuit from drawing current from said tip/ring line;

a third switch having a first terminal coupled to a voltage source and a second terminal coupled to said first capacitor, said third switch being closed during said break state to precharge said first capacitor to enable said first capacitor to transfer charge onto said second capacitor at initiation of said make state;

wherein said RC circuit, said first switch, and said amplification circuit share a common node such that a rate of discharge of a voltage at said common node is controlled by changing at least one value of said second capacitor and said at least one resistor, thereby changing a rate at which a DC loop current at said tip/ring line changes; wherein said amplification circuit comprises an op amp coupled to a first transistor.

2. The DC driver circuit of claim 1 wherein said first transistor is coupled to a second transistor.

3. The DC driver circuit of claim 2 wherein said first and second transistors are coupled to said tip/ring line, wherein said first and second transistors are caused to draw current from said tip/ring line in said make state, and wherein said first and second transistors are prevented from drawing current from said tip/ring line in said break state.

4. The DC driver circuit of claim 1 wherein said first transistor is coupled to said tip/ring line, wherein said first transistor is caused to draw current from said tip/ring line in said make state, and wherein said first transistor is prevented from drawing current from said tip/ring line in said break state.

5. The DC driver circuit of claim 1 wherein said tip/ring line is coupled to a modem.

6. A circuit for reducing a peak voltage at a selected line, said circuit comprising:

at least one transistor driving said selected line;

said at least one transistor being driven by a first capacitor when said circuit is in a make state;

said at least one transistor being driven by an RC circuit when said circuit is in a break state, said RC circuit comprising a second capacitor and at least one resistor;

said RC circuit reducing said peak voltage at said selected line when said circuit transitions from said make state to said break state;

a voltage source coupled to said first capacitor during said break state to precharge said first capacitor to enable said first capacitor to transfer charge onto said second capacitor at initiation of said make state;

wherein said RC circuit, a first switch, and an amplification circuit share a common node such that a iate of discharge of a voltage at said common node is controlled by changing at least one value of said second capacitor and said at least one resistor, thereby changing a rate at which a DC loop current at said selected line changes; wherein said at least one transistor is driven by an op amp.

7. The circuit of claim 6 wherein said op amp is driven by said first capacitor when said circuit is in said make state.

8. The circuit of claim 6 wherein said second capacitor has a first terminal coupled to said op amp and a second terminal coupled to ground.

9. The circuit of claim 8 wherein said first capacitor has a first capacitance value that is substantially greater than a second capacitance value of said second capacitor.

10. The circuit of claim 6 wherein said at least one resistor of said RC circuit has a first terminal coupled to said op amp and a second terminal coupled to ground.

* * * * *

UNITED STATES PATENT AND TRADEMARK OFFICE

CERTIFICATE OF CORRECTION

PATENT NO. : 7,006,623 B1
APPLICATION NO. : 10/016194
DATED : February 28, 2006
INVENTOR(S) : Ketankumar Patel It is certified that error appears in the above-identified patent and that said Letters Patent is hereby corrected as shown below:

In the claims, column 9, line 9, "iate" should be changed to -- rate --.

Signed and Sealed this

Third Day of October, 2006

JON W. DUDAS
*Director of the United States Patent and Trademark Office*